United States Patent [19]
Wysocki et al.

[11] 3,790,251
[45] Feb. 5, 1974

[54] HOLDING FIELD TO IMPROVE THE IMAGE RETENTION OF A CHOLESTERIC NEMATIC PHASE TRANSITION LIQUID CRYSTAL IMAGING SYSTEM

[75] Inventors: Joseph J. Wysocki, Webster; James H. Becker, Penfield; Gary A. Dir, Fairport, all of N.Y.

[73] Assignee: Xerox Corporation, Stamford, Conn.

[22] Filed: Nov. 29, 1971

[21] Appl. No.: 202,746

Related U.S. Application Data
[63] Continuation-in-part of Ser. No. 47,698, June 19, 1970, abandoned.

[52] U.S. Cl............................ 350/160 LC, 350/150
[51] Int. Cl.................................................. G02f 1/16
[58] Field of Search..................... 350/160 LC, 150

[56] References Cited
UNITED STATES PATENTS

| | | | |
|---|---|---|---|
| 3,503,673 | 3/1970 | Heilmeier et al. | 350/160 LC |
| 3,652,148 | 3/1972 | Wysocki et al. | 350/150 |
| 3,642,348 | 2/1972 | Wysocki et al. | 350/150 |

*Primary Examiner*—Edward S. Bauer
*Attorney, Agent, or Firm*—James J. Ralabate; David C. Petre; Gaetano D. Maccarone

[57] ABSTRACT

An imaging system including an imaging layer comprising cholesteric liquid crystalline material in an electrical field capable of having field strengths in the cholesteric nematic phase transition field strength range or the Grandjean to focal-conic texture transformation field strength range of the liquid crystalline imaging material. The imaging material is typically imaged by placing an imagewise phase-transition or texture-transformation inducing electrical field across a layer of imaging material. The present invention controls such an imaging system by maintaining a substantially uniform holding field across the entire surface of the imaging material, said holding field typically being maintained across the imaging material after it has been imaged. The holding field may be applied in the form of various phenomena. The particular type of holding field applied has field strengths below the cholesteric-nematic phase transition or the Grandjean to focal-conic texture transformation field strength thresholds of the imaging material. The imaging system, and especially its image memory and image relaxation characteristics are controlled by varying the strength of the holding field, and by applying field pulses in imagewise configuration to image the liquid crystalline imaging material, or by pulsing the field uniformly across the entire surface of the imaging material to field strengths above the phase-transition threshold or the texture transformation threshold, thereby enhancing the image already formed in the imaging material.

22 Claims, 3 Drawing Figures

INVENTORS.
JOSEPH J. WYSOCKI
JAMES H. BECKER
GARY A. DIR

BY J.D. Maccarone

ATTORNEY

A HOLDING FIELD TO IMPROVE THE IMAGE RETENTION OF A CHOLESTERIC NEMATIC PHASE TRANSITION LIQUID CRYSTAL IMAGING SYSTEM

CROSS-REFERENCE TO RELATED CASES

This application is a continuation-in-part application of copending patent application Ser. No. 47,698, filed June 19, 1970 now abandoned.

BACKGROUND OF THE INVENTION

This invention relates to imaging systems, and more specifically, to an imaging system wherein the imaging member comprises a liquid crystalline material. Furthermore, this invention more specifically relates to the control of such liquid crystalline imaging systems.

Recently there has been substantial interest in the discovery of more useful applications for the class of substances known as "liquid crystals." The name "liquid crystals" has become generic to liquid crystalline materials which exhibit dual physical characteristics some of which are typically associated with liquids and others which are typically unique to solids. Liquid crystals exhibit mechanical characteristics, such as viscosities, which are ordinarily associated with liquids. The optical scattering and transmission characteristics of liquid crystals are similar to those characteristics ordinarily unique to solids. In liquids or fluids, the molecules are typically randomly distributed and oriented throughout the mass of the substance. Conversely, in the crystalline solids the molecules are generally rigidly oriented and arranged in a specific crystalline structure. Liquid crystals resemble solid crystals in that the molecules of the liquid crystalline substances are regularly oriented in a fashion analogous to but less extensive than the molecular orientation and structure in a crystalline solid. Many substances have been found to exhibit liquid crystalline characteristics in a relatively narrow temperature range; but below that temperature the substances typically appear only as crystalline solids, and above that temperature range they typically appear only as liquids. Liquid crystals are known to appear in three different mesomorphic forms: the smectic, nematic, and cholesteric. In each of these structures the molecules are typically arranged in a unique orientation.

Liquid crystals have been found to be sensitive or responsive to temperature, pressure, foreign chemical compounds, and to electric and magnetic fields, as disclosed in copending application Ser. No. 646,532, filed June 16, 1967; copending application Ser. No. 4,644, filed Jan. 21, 1970; Fergason et al. U.S. Pat. No. 3,114,838 and 3,410,999; French U.S. Pat. No. 1,484,584; Fergason U.S. Pat. No. 3,409,404; Waterman et al. U.S. Pat. No. 3,439,525; and in Woodmansee U.S. Pat. No. 3,411,513.

Most recently, imaging systems wherein the imaging member comprises a liquid crystalline material have been discovered, and are described, for example, in copending applications Ser. No. 821,565, filed May 5, 1969 now U.S. Pat. No. 3,622,224; Ser. No. 851,708, filed Aug. 20, 1969 now U.S. Pat. No. 3,622,224; and Ser. No. 867,593, filed Oct. 20, 1969 now U.S. Pat. No. 3,642,348.

In new and growing areas of technology such as liquid crystals, new methods, apparatus, compositions of matter and articles of manufacture continue to be discovered for the application of the new technology in a new mode. The present invention relates to a new and advantageous imaging system wherein the imaging member comprises a liquid crystalline material, and systems for controlling such liquid crystalline imaging members and systems.

SUMMARY OF THE INVENTION

It is, therefore, an object of this invention to provide a novel imaging system.

It is another object of this invention to provide a novel liquid crystal imaging system.

It is another object of this invention to provide a novel system for controlling a liquid crystalline imaging system.

It is another object of this invention to provide a system for controlling the return of an imaged liquid crystalline imaging member to its equilibrium state.

It is another object of this invention to provide a system for increasing the speed of response in re-imaging such a liquid crystalline imaging system.

It is yet another object of this invention to control the texture of the liquid crystalline imaging material.

It is still another object of this invention to provide a liquid crystalline imaging system wherein the light permitted to be transmitted through the imaged areas is substantially brighter than that permitted to be transmitted through such image areas in previous liquid crystalline imaging members.

The foregoing objects and others are accomplished in accordance with this invention by an imaging system including an imaging layer comprising cholesteric liquid crystalline material in an electrical field capable of having field strengths in the cholesteric-nematic phase transition field strength range or the Grandjean to focal-conic texture transformation field strength range of the liquid crystalline imaging material. The imaging material is typically imaged by placing an imagewise phase-transition or texture transformation inducing electrical field across a layer of imaging material. The present invention controls such an imaging system by maintaining a substantially uniform holding field across the entire surface of the imaging material, said holding field typically being maintained across the imaging material after it has been imaged. The holding field may be applied in the form of various phenomena. The particular type of holding field applied has field strengths below the cholesteric-nematic phase transition or the Grandjean to focal-conic texture transformation field strength thresholds of the imaging material. The imaging system, and especially its image memory and image relaxation characteristics are controlled by varying the strength of the holding field, and by applying field pulses in imagewise configuration to image the liquid crystalline imaging material, or by pulsing the field uniformly across the entire surface of the imaging material to field strengths above the phase-transition threshold or the texture transformation threshold, thereby enhancing the image already formed in the imaging material.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

Figure 1:
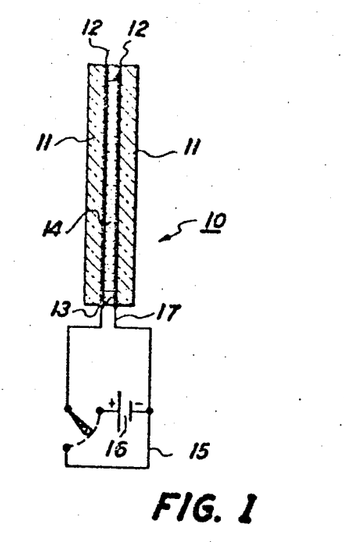
FIG. 1 is a partially schematic, cross-sectional view of a liquid crystalline imaging member.

In FIG. 1 a typical liquid crystalline imaging member 10, sometimes referred to as an electroded imaging sandwich, is shown in partially schematic, cross-section wherein a part of substantially transparent plates 11 having substantially transparent conductive coating 12 upon the contact surfaces thereof, comprises a parallel pair of substantially transparent electrodes. An imaging member wherein both electrodes are transparent is preferred where the imaging member is to be viewed using transmitted light; however, a liquid crystalline imaging member may also be viewed using reflected light thereby requiring only a single transparent electrode while the other may be opaque. The transparent electrode is separated by spacing member or gasket 13 which contains one or more voids which contain the liquid crystalline film or imaging layer which comprises the active element of the imaging member. A field is created between the electrodes, for example, by an external circuit 15 which typically comprises a source of potential 16 which is connected across the two electrodes through leads 17. The potential source may be either D.C., A.C., or a combination thereof. In such an imaging system it has been discovered that when cholesteric liquid crystals or a mixture comprising cholesteric liquid crystalline materials is used in such an electrode sandwich, the electrical fields across the liquid crystalline film cause the optical appearance of such liquid crystalline films to visibly change in the field-affected areas.

When high electrical fields are placed across the liquid crystalline imaging member, an electrical field-induced phase transition occurs wherein the optically negative cholesteric liquid crystalline material transforms into an optically positive liquid crystalline state. This transition is believed to be the result of the cholesteric liquid crystal material transforming into an aligned nematic liquid crystalline mesophase structure. This cholesteric-nematic phase transition imaging system is fully described in copending application Ser. No. 821,565, filed May 5, 1969 now U.S. Pat. No. 3,652,148, the entire disclosure of which is hereby incorporated by reference into the present specification.

The cholesteric-nematic phase transition is the primary liquid crystalline imaging mechanism which is used in the present invention. Cholesteric liquid crystalline materials in the cholesteric state are typically translucent, for example, like a milky white, opalescent layer. This is the way that such materials frequently appear when first placed in the unbiased electrode sandwich. When a high magnitude electric field is placed across the liquid crystalline film, the field-induced phase transition is observable because the liquid crystalline film becomes transparent in areas where the high electric field is present. When the imaging member is viewed between polarizers with transmitted light, the areas in which the field-induced phase change has taken place appear dark, while the unchanged, translucent, light scattering, optically active and birefringent, cholesteric areas still retain their white appearance. Although polarizers have just been described as a convenient means for enhancing the contrast of the imaged areas other enhancement techniques may also be used in place of such polarizers. It is therefore clear that either field or non-field areas in a liquid crystalline imaging member may be used as the desired image, with or without the addition of other means for image enhancement.

The same apparatus and materials used as an imaging system wherein the cholesteric-nematic phase transition mechanism is used, may also be used to cause an electrical field-induced texture transition to occur wherein a cholesteric liquid crystalline material initially in its Grandjean or "disturbed" texture is transformed into its focal-conic or "undisturbed" texture. The voltages and field strengths typically used for imaging the liquid crystalline imaging members by the texture change mechanism typically have lower magnitudes than the voltages and field strengths used in the phase transition already described above. This electrical field-induced texture transition system is fully described in copending application Ser. No. 867,593, filed Oct. 20, 1969 now U.S. Pat. No. 3,642,348, the entire disclosure of which is hereby incorporated by reference into the present specification.

The Grandjean texture is typically characterized by selective dispersion of incident light around a wavelength $\lambda_o$ (where $\lambda_o = 2np$ where $n$ equals the index of refraction of the liquid crystalline film and $p$ equals the pitch of the liquid crystalline film) and optical activity for wavelengths of incident light away from $\lambda_o$. If $\lambda_o$ is in the visible spectrum, the liquid crystalline film appears to have the color corresponding to $\lambda_o$, and if $\lambda_o$ is outside the visible spectrum the film appears colorless and non-scattering. The Grandjean texture of the cholesteric liquid crystalline material is sometimes referred to as the "disturbed" texture.

The focal-conic texture is also typically characterized by selective dispersion, but in addition this texture also exhibits diffuse scattering in the visible spectrum, whether $\lambda_o$ is in the visible spectrum or not. The appearance of the focal-conic texture state is typically milky-white when $\lambda_o$ is outside the visible spectrum. The focal-conic texture of cholesteric liquid crystals is sometimes referred to as the "undisturbed" texture.

If the unbiased electrode sandwich containing an imaging composition comprising cholesteric liquid crystals predominantly in the Grandjean texture state is observed between polarizers, the imaging sandwich appears colored or black. When the electrical field is placed across the liquid crystalline film, with field strengths in the field-induced texture change range, the texture change to the predominantly focal-conic texture state is observable because the liquid crystalline film becomes white in the field-affected areas when the imaging sandwich is observed in transmitted or reflected light. The texture change imaging system thereby produces white image (or field-affected) areas on a darker colored background. Like the phase-transition system, the texture change imaging system may also be used with or without the use of polarizers or other image enhancing devices.

In the liquid crystal imaging members of the present invention, the electrodes may be of any suitable transparent conductive material; however, opaque electrodes may be used, at least in part, in some embodiments. Typical suitable transparent, conductive electrodes include glass or plastic substrates having substantially transparent and continuously conductive coatings of conductors such as tin, indium oxide, aluminum, chromium, tin oxide, or any other suitable conductor. These substantially transparent conductive coatings are typically evaporated onto the more insulating, transparent substrate. NESA glass, a tin oxide coated glass manufactured by the Pittsburgh Plate Glass Company, is a commercially available example of a typical transparent, conductive electrode material.

The spacer, 13 in FIG. 1, which separates the transparent electrodes and contains the liquid crystal film between said electrodes, is typically chemically inert, transparent, substantially insulating and has appropriate dielectric characteristics.

Materials suitable for use as such spacers include cellulose acetate, cellulose triacetate, cellulose acetate butyrate, polyurethane elastomers, polyethylene, polypropylene, polyesters, polystyrene, polycarbonates, polyvinylfluoride, polyetrafluoroethylene, polyethylene terephthalate, and mixtures thereof.

Any suitable cholesteric liquid crystal, mixture or composition comprising liquid crystals, or composition having cholesteric liquid crystalline characteristics may be used in the imaging system of the present invention. Cholesteric liquid crystals suitable as the electro-optic imaging materials in the present invention include derivatives from reactions of cholesterol and inorganic acids; for example, cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl chloroformate; cholesteryl proprionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caprate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy)ethyl carbonate; cholesteryl-2-(2-Butoxyethoxy)ethyl carbonate; cholesteryl-2-(2-methoxyethoxy)ethyl carbonate; cholesteryl heptyl carbamate; and alkyl amides and alphatic secondary amines derived from 3 β-amino- Δ 5-cholestene and mixtures thereof; peptides such as poly-benzyl-glutamate; derivatives of beta sitosterol such as sitosteryl chloride; and active amyl ester of cyan benzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable cholesteric liquid crystalline materials in the advantageous system of the present invention.

Smectic liquid crystalline materials are suitable for use as components of the imaging composition in the present invention and such smectic liquid crystal materials include: n-propyl-4'-ethoxy biphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of 7 or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphaeyl-4-carboxylic acids; ethyl p azoxycinnamate; ethyl-p-4-ethoxybenzylideneaminocinnamate; ethyl-p-azoxybenzoate; potassium oleate; ammonium oleate; p-n-octyloxybenzoic acid; the low temperature mesophase of 2-p-n-alkoxy-benzylideneaminofluorenones with chain length of 7 or greater; the low temperature mesophase of p-(n-heptyl)oxybenzoic acid; anhydrous solid stearate; thallium (I) stearate; mixtures thereof and others.

Nematic liquid crystalline materials suitable for use as components of the imaging composition in the advantageous system of the present invention include: p-azoxyanisole, p-azoxyphenetole, p-butoxybenzoic acid, p-methoxy-cinnaminic acid, butyl-p-anisylidene-p-aminocinnamate, anisylidene para-aminophenylacetate, p-ethoxy-benzalamino-α-methylcinnamic acid, 1,4-bis (p-ethoxy benzylidene) cyclohexanone, 4,4'-dihexyloxybenzene, 4,4'-diheptyloxybenzene, anisal-p-amino-azo-benzene, anisaldazine, a-benzeneazo- (anisal-α'-naphthylamine), n,n'-nonoxybenzeltoluidine, mixtures of the above and many others.

The above lists of material exhibiting various liquid crystalline phases are not intended to be exhaustive or limiting. The lists disclose a variety of representative materials suitable for use in the imaging composition or mixture comprising cholesteric liquid crystalline materials, which comprises the active imaging element in the advantageous system of the present invention.

The liquid crystalline materials may be prepared by dissolving the liquid crystals or mixtures thereof in any suitable solvent, for example organic solvents such as chloroform, trichloroethylene, tetrachloroethylene, petroleum ether, methyl-ethyl ketone, and others. The solution containing the liquid crystal material is then typically poured, sprayed or otherwise applied into the imaging members. After evaporation of the solvent, a thin layer of liquid crystals remains. Alternatively, the individual liquid crystals of the liquid crystalline mixture can be combined and applied directly by heating the mixed components above the isotropic transition temperature.

The liquid crystal imaging layers or films suitable for use in the present invention are preferably of a thickness in the range of about 10 mils or less, although thicker films will perform satisfactorily in the inventive system. Optimum results are typically achieved using layers in the thickness range between about ¼ mil and about 5 mils.

Although the cholesteric-nematic phase transition mechanism and the Grandjean to focal-conic texture transition mechanism have both been described with reference to a preferred embodiment wherein these transitions are caused to occur by the application of an electric field to a layer of cholesteric liquid crystalline material, there are other phenomena by which these transitions may be accomplished. Thus it is possible to carry out the cholesteric-nematic phase transition and the Grandjean to focal-conic texture transition with electrical fields, magnetic fields, thermal fields, photochemical effects, static pressure effects, acoustic and ultrasonic fields, surface forces, and combinations of these phenomena.

The use of electrical fields to carry out these transitions has been disclosed in the copending patent applications referred to above. The use of magnetic fields alone to effect the cholesteric-nematic phase transition has been disclosed in the art. See Sackmann et al., J. Am. Chem. Soc. 89, 5981 (1967).

Thermal fields can be used with mixtures of right-handed and left-handed cholesteric materials or materials with an effective right-handed or left-handed nature in a chiral environment to cause the transitions. If the materials used in the mixture are suitably chosen the composition can be converted to a nematic (compensated) state by addition or subtraction of thermal energy, i.e. a change in temperature. At compensation the net chirality is zero. Thus a thermal field can cause a cholesteric-nematic or nematic-cholesteric transition. Generally higher resolution can be obtained in transient thermal displays than with static thermal displays; however additional memory and resolution enhancement can be obtained by appropriate biasing stimuli such as thermal, electrical or magnetic fields. Use of materials having a long relaxation time can also provide memory effects, typically of intermediate duration.

It has been disclosed in the art that ultra-violet radiation can photo-decompose suitable cholesteric liquid crystalline materials which causes a change in pitch (and therefor the color reflected by) of the resultant material. It has now been found that this phenomenon can be utilized to achieve a cholesteric-nematic phase transition. Furthermore this procedure can provide a permanent or temporary display dependent upon the nature of the materials an whether recombination of the decomposition products is provided for. In an imaging device a mixture of right-handed and left-handed cholesteric liquid crystalline ingredients which include at least one photo-degradable constituent such as cholesteryl iodide may be employed. The action of the ultra-violet radiation will typically convert the photo-degradable material into a different species thereby upsetting the initial ratio of right-handed and left-handed materials. By a suitable adjustment of the components of the mixture and the length of exposure, the resultant mixture is typically converted to the nematic state at a chosen temperature in the radiation-affected areas whereas the non-imaged or background areas are not converted in this manner. An interesting feature of such an imaging scheme is that the character of the image can be temporarily (barring diffusion) modified by changing the sample temperature. Moreover the mixture of materials having opposite handedness may be achieved not only by the initial combination of such materials but also by the imaging process itself, i.e. by conversion of part of the material of a given chirality to another of the opposite chirality by means of photochemical action.

It is known in the art that static pressure applied to individual cholesteric liquid crystalline compounds and also mixtures of such compounds, usually reduces the pitch of the material. This effect may be utilized to obtain a nematic-cholesteric phase transition where a compensated composition is employed. It is to be expected that systems containing mixtures of right-handed and left-handed cholesteric liquid crystalline materials could be formulated wherein static pressure, rather than reducing the pitch of the mixture, would increase it and affect it enough to induce a nematic transition at a particular operating temperature. Static pressure would therefore typically change the effective rotary power of the compositions.

A further static pressure effect which would be useful to achieve the phase transition is based on the fact that the threshold electric field is a unique feature of any system. Thus for a given applied voltage, a change in the thickness of the liquid crystalline imaging layer will change the strength of the applied field. When the layer is deformed by static pressure so that the layer thickness is reduced, the initial applied voltage which was initially not sufficient to cause the phase transition will correspond to a higher field and thus cause the desired cholesteric-nematic phase transition to occur. This mode of operation has particular advantage for a controlled memory display as is disclosed in the present application since the same applied voltage may serve as both the transforming and the holding voltage. This mode of operation typically allows retention of pressure patterns on the liquid crystalline imaging layer long after the pressure itself is removed therefrom. The combination of pressure and voltage can thus be advantageously utilized to sharpen the threshold for the cholesteric-nematic transition and to alter the transformation and relaxation times for this transition.

The foregoing considerations relative to static pressure fields are also pertinent to dynamic pressure fields. Additionally, pressure may give rise to internal voltages (piezoelectric effects) which alter the transitions.

It is known in the art that surfaces may interact with cholesteric liquid crystalline materials principally in establishing the texture of the material. Additionally it is also well known that such surface interactions can be modified by surface treatments for example such as by rubbing the surface or by applying thereto surface coating of materials such as lecithin or the like. Generally speaking, imagewise changes in surface interactions to achieve the phase transition in imagewise fashion may typically be effected.

These various stimuli discussed above have been described with respect to their efficacy in facilitating the cholesteric-nematic phase transition. These stimuli, individually or in combination, typically influence the Grandjean-focal-conic texture change as well and therefore the stimuli have utility in texture change display systems as well as in phase transition display systems.

Figure 2:
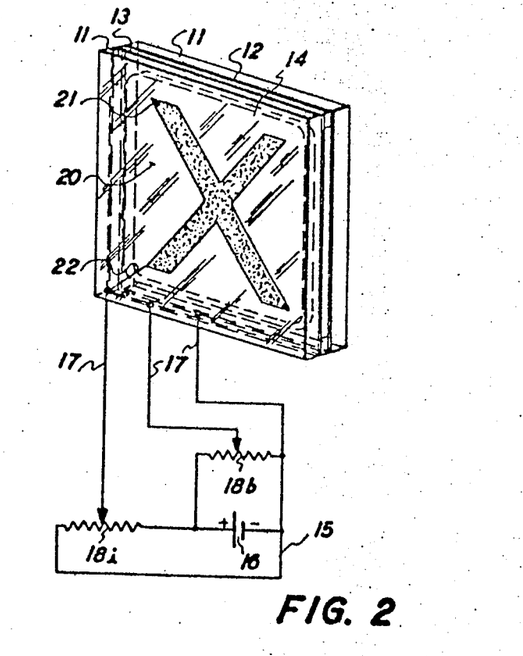
FIG. 2 is a partially schematic, isometric view of an embodiment of a liquid crystalline imaging member wherein the desired image is defined by the shape of at least one of the electrodes.

FIG. 2 is a partially schematic, isometric view of a liquid crystalline member preferred for use in the present invention. This imaging member, like the one illustrated in FIG. 1, comprises substantially transparent plates 11 having substantially transparent conductive coatings, here separately designated 12, 20 and 21, upon the contact surfaces of the transparent plates 11. Spacing member gasket 13 and liquid crystalline film or imaging layer 14 are identical to those described in conjunction with FIG. 1. In FIG. 2 the substantially transparent conductive coating 12 which is behind the liquid crystalline imaging composition 14, is a single, substantially continuous, electrically conductive, transparent coating. However, transparent continuous conductive coatings 20 and 21, on the substantially transparent plate 11 illustrated in front of the liquid crystalline imaging composition 14 are in complementary imagewise configurations which are separated by an insulating space or material at the boundaries of the imagewise configuration electrode designated 21. Because imagewise electrode 21 is not electrically connected to its complementary, coplanar background electrode 20, an appropriately electrically insulated conductive lead 22 is provided to connect the imagewise electrode 21 with the external circuitry 15. Although in FIG. 2 the imagewise electrode 21 is illustrated by a more dense dot pattern indicating its substantially transparent and conductive nature, the complementary background electrode 20, typically comprises exactly the same substantially transparent, electrically conductive material which comprises the imagewise electrode 21, and the two areas are illustrated differently in FIG. 2 only for the purpose of clarity in distinguishing the image and background areas of the coplanar, complementary imagewise and background electrodes.

In FIG. 2 the external circuit 15 which is connected to the various electrodes in the imaging member by conductive electrical leads 17, is illustrated containing source of potential 16 and potentiometers 18$i$ and 18$b$ as suitable means for controlling the voltage and therefore the fields strengths, in the image and background areas, respectively, in the imaging member. The electrical circuit illustrated in FIG. 2 is one suitable means for the application of the desired imaging and holding fields across the imaging composition, and it will be understood that any suitable means, such as other electrical circuits for providing the desired fields in the inventive system may be used in the advantageous system of the present invention. In operation, an imaging composition which is typically in its predominantly Grandjean texture state is typically made to adopt the focal-conic texture by adjusting potentiometers 18$i$ and 18$b$ to establish between electrodes 12 and 20 and electrodes 12 and 21 electric fields within the Grandjean to focal-conic texture transformation field strength range of the imaging composition thus causing the liquid crystalline film to appear white or light-scattering. Potentiometer 18$i$ is then adjusted to establish between electrodes 12 and 21 an electric field within the cholesteric-nematic phase transition field strength range of the imaging composition and the field is maintained until the composition between electrodes 12 and 21 becomes clear thus indicating that the phase transition has taken place. The imaging composition between electrodes 12 and 20 remains in a light scattering condition. Hence, an image comprising a clear image area on a light scattering background is formed. A holding field is then applied across the entire liquid crystalline film by adjusting potentiometers 18$i$ and 18$b$ to establish across the entire film an electric field having a strength below the phase transition field strength range of the imaging composition. Of course it will be recognized that this embodiment is illustrative and other embodiments may be practiced.

When the imaging composition is placed in the imaging sandwich or member, and if said member is observed between crossed polarizers (as image enhancing devices) the imaging layer frequently appears colored or black, i.e., the imaging composition is initially in its predominantly Grandjean or "disturbed" texture. When an electrical field having field strength in the field-induced texture change range is placed across the liquid crystalline film, for example by adjusting potentiometer 18$i$, illustrated in FIG. 2, the electrical field is thereby placed between the imagewise substantially transparent electrode 21 and the opposite electrode 12, and the imaging composition comprising cholesteric liquid crystals predominantly assumes its focal-conical or "undisturbed" texture in the field-affected areas and the texture change is observable because the liquid crystalline film becomes white in said areas. Similarly, the background image areas or indeed any area in such a liquid crystalline imaging member may be placed predominantly in the focal-conic or "undisturbed" texture by placing an electrical field having field strength within the field-induced texture change range across such an imaging composition comprising cholesteric liquid crystals. In this way, the texture of an entire liquid crystalline imaging member may be uniformly maintained in a substantially uniform electrical field acting upon said composition.

Where field strengths typically higher than the field-induced texture change field strength range, and above the cholesteric-nematic phase transition threshold field strength are used, the imaging composition comprising cholesteric liquid crystals exhibits the field-induced phase transition transforming the field-affected areas into the nematic liquid crystalline mesophase structure. This cholesteric-nematic phase transition is the primary imaging mechanism in the present invention whereby the imaging composition is changed from its typically translucent, milky white, opalescent appearance, into a substantially transparent film in the areas where the high electrical fields are present across the imaging composition. In this way, images, for example images comprising transparent image areas on white or colored background areas, are produced by the advantageous imaging system of the present invention.

In the imaging system and image control system of the present invention it has been found to be particularly advantageous to maintain a substantially uniform holding field having field strengths below the cholesteric-nematic phase transition or the texture transformation threshold field strengths of the imaging composition comprising cholesteric liquid crystals, and to maintain such a holding field across said composition whenever the imaging member is being used, during both image "on" and image "off" periods. The holding field may be applied in the form of any of the various phenomena previously described with respect to effecting the cholesteric-nematic phase transition and the Grandjean to focal-conic texture transformation. Thus the holding field, or stimuli, may be a magnetic field, an electrical field, a thermal field, various types of pressure fields including static, dynamic and piezoelectric, photochemical action, surface effects and combinations thereof.

For purposes of illustrating the invention it will be described in detail hereinafter with respect to the use of an electrical field as the holding field. By maintaining a substantially uniform field across the imaging composition, it has been found that the texture of the entire imaging composition layer can be maintained in a substantially uniform condition, as already described above. Furthermore it has been found that after the imaging composition has been imaged by the cholesteric-nematic phase transition mechanism, and the phase transition imaging field is removed, that the application of the advantageous holding field of the present invention maintains the composition in a partially transformed or partially aligned state, which facilitates re-imaging of the imaging composition. It is believed that the previously phase-transition imaged areas of the composition are maintained in a partially transformed state, so that the subsequent application of a phase-transition imaging field causes the image to re-appear or to be renewed in a shorter time than was formerly possible when the imaging composition was allowed to return to its equilibrium state in the absence of the advantageous holding field of the present invention. The holding field even makes possible the renewal of an image by briefly increasing the field strength across the entire surface area of the imaging composition to a field strength above the phase-transition threshold, as well as by the more conventional application of an imagewise phase-transition field. It is therefore seen that the holding field of the present invention controls the return of the imaged liquid crystalline composition to its equilibrium state. The transient return of the composition to its equilibrium state and the control of that transient response of the composition which is made possible by the present invention, may itself be used as an imaging system, as described later herein.

The following will be descriptive of the proposed theoretical mechanism by which the process of the invention is operative. It should be understood however that the invention has been found to be very effective through experimentation and any inaccuracy in the theoretical operation thereof as described is not to be construed as being limiting of the invention. Consider an imaging element comprising a layer of cholesteric liquid crystalline material between a pair of parallel plates. The imaging processes typically utilized in the inventive process, that is the cholesteric texture transformation and the cholesteric-nematic phase transition, may be described in their broadest sense as a re-alignment of the direction of the molecules of the liquid crystalline imaging material with respect to the surface planes of the plates or the direction of the light impinging on the plates. Imaging is typically effected by applying a suitable field, e.g. an electric field, across the liquid crystal imaging layer so as to cause a cholesteric-nematic phase transition or a cholesteric texture transformation in the field-affected areas of the liquid crystal layer. Generally, for each of the various stimuli which can be used to effect imaging, as previously described, there is a threshold field which typically should be exceeded for imaging to occur. These threshold fields are, inter alia, functions of the chemical composition of the liquid crystalline imaging layer. Typically the threshold fields are very sharp for the cholesteric-nematic phase transition and relatively less sharp for the cholesteric texture transformation.

Thus the field-affected areas are in a different state than those areas of the liquid crystal layer across which the field was not applied. The condition of the field-affected areas (which may be the image portions or the background portions of the liquid crystal layer) is a relatively unstable one. In these field-affected areas the liquid crystalline material typically desires to return to its original state when the imaging stimulus is removed therefrom. In the cholesteric-nematic phase transition the field-affected areas typically return to their initial state in a matter of seconds when the imaging field is removed. For the cholesteric texture change the degree of instability of the field-affected areas can vary considerably. The instability of the field-affected areas is most pronounced when the texture transformation is not complete, i.e. when all of the molecules of the liquid crystalline material are not transformed. It may be generally said that the decay time, i.e. the time required for the liquid crystalline material in the field-affected areas to return to its original condition, varies monotonically with the proportion of molecules transformed from their original texture to the other texture when the stimulus is applied thereto. The actual decay times can vary over a relatively wide range and are subject to the thickness of the imaging cell, the liquid crystalline composition, surface treatments, etc. Decay times of from a few seconds to days have been observed.

The present invention is operative by preventing the field-affected areas from returning to their original state for an extended period of time after the imaging stimulus has been removed from the liquid crystal layer. This is accomplished by applying to the liquid crystal layer a uniform holding field which is preferably biased closely to the threshold field typically necessary to convert the liquid crystalline material from its original state to its changed state in order for imaging to occur. Generally the duration of the time period over which the image can be maintained according to the invention is related to the sharpness of the threshold field and typically is directly related to the proximity of the holding field to the threshold field.

It will be recognized by those skilled in the art that when photochemical effects are utilized for imaging the situation is somewhat different than when the other stimuli are used since the changes brought about in the liquid crystalline imaging material by photochemical effects are essentially irreversible. Photochemical effects provide imaging by causing the composition of the liquid crystal layer to change in the field-affected areas. It will be further appreciated that since the threshold fields for the various impinging stimuli are dependent upon the chemical composition of the imaging layer, as aforesaid, the threshold field values for the various stimuli change when the chemical composition of the liquid crystal layer is altered.

As illustrated in copending application Ser. No. 821,565 now U.S. Pat. No. 3,652,148, the cholesteric-nematic phase transition imaging system of the present invention typically requires phase-transition fields of field strength on the order of magnitude, for example, of about $10^4$ to $10^5$ volts per centimeter. While these orders of magnitude of the phase transition threshold fields are typically suitable for use in phase-transition imaging in the advantageous system of the present invention, it should be understood that the phase-transition threshold field strength varies corresponding to the particular imaging composition and other physical environmental conditions at which each imaging composition may be imaged. The phase-transition threshold for imaging compositions used in the advantageous control system of the present invention typically defines the least upper bound of field strengths suitable for use as the advantageous holding field in the image control system of the present invention.

Figure 3:
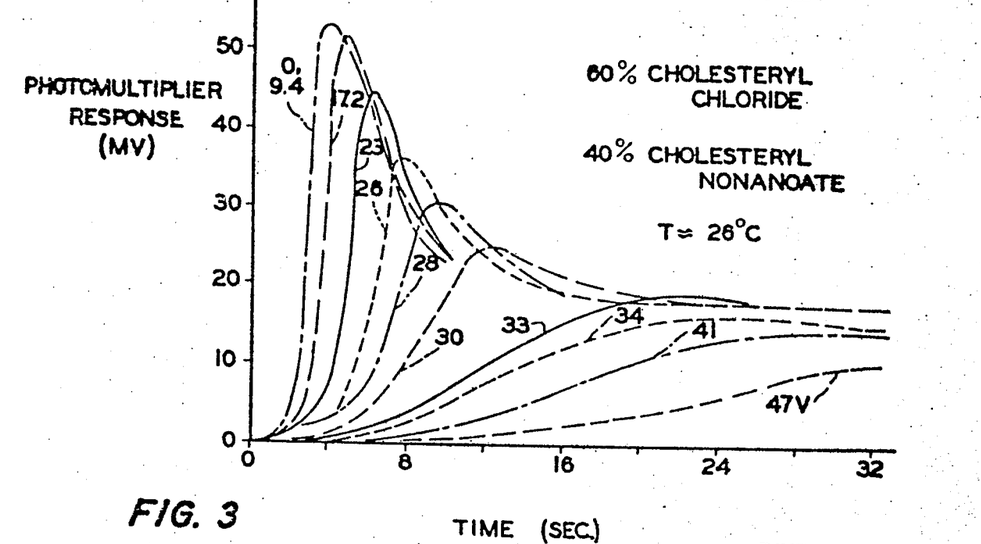
FIG. 3 is a Photomultiplier Response vs. Time plot for a specific liquid crystalline imaging system wherein the substantially uniform holding field maintained across the imaging member is varied for various transient responses of the imaging system from the nematic state back into the cholesteric state. The data in this figure represents transient responses of the system corresponding to various holding field strengths, respectively.

The surprising and advantageous effects of the present invention wherein a substantially uniform electrical holding field below the phase-transition field strength threshold is maintained across the entire surface area of such a liquid crystalline imaging member is more clearly pointed out by the data shown in FIG. 3, which is representative for liquid crystalline imaging systems such as those used in the inventive system. Although FIG. 3 is a Photomultiplier Response vs. Time plot for a specific liquid crystalline imaging system, here an imaging composition comprising cholesteric liquid crystals, of about 60% cholesteryl chloride and about 40% cholesteryl nonanoate, it will be understood that other liquid crystalline systems using other compositions exhibit similar characteristics. The data illustrated in FIG. 3 show photomultiplier responses corresponding to the times of such responses, said times being measured from the time that a phase-transition imaged member has the transition-inducing field removed therefrom. The various response data lines represent the various responses of the particular liquid crystalline imaging system when used with holding fields having field strengths below the phase-transition threshold, and such fields are maintained across the entire surface area of the imaging member during various imaging sequences of the imaging cell. In the system represented by the data in FIG. 3 the substantially uniform holding field maintained across the entire surface area of the imaging member is shown to have been varied through the range between about 0 and about 47 volts, with the higher uniform field strengths attenuating the peak transmissivity until the transient response of the imaging cell, here represented by the Photomultiplier Response vs. Time Data, asymptotically approaches the system's equilibrium condition, which is here represented by a photomultiplier response somewhere between about 10 and about 20 mV. The photomultiplier responses are proportional to the amount of light transmitted through the previously imaged (phase-transformed) areas of the imaging composition. The data in FIG. 3 clearly illustrates the the maintenance of the substantially uniform electrical holding field, of field strength below the phase-transition threshold field strength, across the entire surface area of such a liquid crystalline imaging member, controls the transient response of the imaging material in returning to its equilibrium state after the phase-transition inducing electrical fields, have been removed, or reduced in magnitude.

Another advantageous result from the use of such substantially uniform holding fields maintained across the entire surface area of such liquid crystalline imaging members is the resultant reduction in the amount of additional field strength necessary to phase-transition image desired image areas of the imaging composition. For example, if a substantially uniform field strength maintained across the entire surface area of an imaging member is about 50 volts, and the phase-transition threshold field strength for the imaging members is about 200 volts, it is necessary to place only an additional field of strength greater than about 150 volts across the desired image areas in order to produce the desired phase-transition image in the cholesteric liquid crystalline imaging composition.

In addition, the decreased imaging time (discussed earlier above) can at least in part be explained because the presence of the substantially uniform holding field is believed to maintain the cholesteric liquid crystalline material predominantly in its focal-conic or "undisturbed" state thereby eliminating the increment of the response time typically necessary to transform the cholesteric liquid crystalline material from its original predominantly Grandjean or "disturbed" texture state into its predominantly "undisturbed" state before continuing through the cholesteric-nematic phase transition imaging which is the primary imaging mechanism in the advantageous system of the present invention.

Chemical compounds which exhibit one or more of the three well known liquid crystalline mesophases, typically exhibit those liquid crystalline structures only within a corresponding temperature range. In addition, the behavior of such a liquid crystalline compound, or a mixture comprising such compounds or having cholesteric liquid crystalline characteristics, may be different at various temperatures within the liquid crystalline temperature range of the particular composition. For example, the viscosity of such liquid crystalline composition is typically temperature dependent, and the electrical responses of the liquid crystalline composition, such as those responses which are the operative imaging mechanisms in the advantageous system of the present invention, is dependent upon the temperature at which the novel imaging and control system is being operated. For example, it might reasonably be expected that post-imaging relaxation responses would take a longer time where the liquid crystalline imaging composition being used was at a lower temperature and therefore typically at a higher viscosity.

Although the advantageous imaging and control system of the present invention has been described above in conjunction with a simple alpha-numeric display device such as that illustrated in FIG. 2, any suitable means for maintaining a holding field having field strengths below the cholesteric-nematic phase transition for the particular imaging composition, may be used, along with other means for providing imagewise fields having strengths above the phase-transition threshold, thereby enabling one to image such a liquid crystalline imaging composition by the phase-transition mechanism of the present invention and to control such an imaging system by the advantageous system of the present invention. For example, any suitable X-Y address system may be used, or any other suitable address system, such as an electron beam address system, or other electrographic techniques such as electric stylii or electrographic address systems using photosensitive or photoconductive elements to form electrographic images may be used to electrically address the inventive system.

Because of the additional control provided over the phase transition imaging mechanism by the instant inventive imaging and imaging control system, through the use of a substantially uniform holding field of field strength below the phase-transition threshold field strength, it is also possible to renew a phase-transformed image by uniformly pulsing the field across the entire surface area of the imaging composition to a field strength of magnitude above the phase-transition threshold, for a short time, thereby giving the previously imaged areas sufficient time to respond to the phase-transition field strengths, while not maintaining the high field strength pulse across the entire surface area of the imaging composition sufficiently long to allow the background or previously unimaged areas sufficient time to exhibit the phase transition. In this way, suprisingly, the previous image may be renewed without applying an imagewise field to the imaging composition.

In still another mode, the advantageous system of the present invention may be used to control the amount of light transmitted through the previously imaged (phase-transformed) areas of an imaging composition comprising cholesteric liquid crystals by using the short bright burst of light transmitted through such areas, when such areas exhibit their maximum transmissivity as a unique transient imaging system in itself. As already noted above, these periods of maximum transmissivity of the previously imaged areas of the imaging composition correspond to the peak photomultiplier responses as illustrated for example in FIG. 3. By controlling the uniformly maintained field having field strengths below the phase-transition threshold, as described in the present invention, the length and timing of the period of maximum transmissivity of the imaging composition may be controlled to provide for an enhanced contrast display which may operate between the transformed (nematic) state and the transient state through which the composition passes, and especially the period of maximum transmissivity, while resuming its equilibrium state. Such an enhanced contrast imaging system is typically viewed when the material is in the state corresponding to the maximum transmissivity and the timing of the maximum transmissivity may be synchronized with a transmitted flash of light thereby further enhancing the contrast displayed by the imaging cell during the brief transient period of maximum transmissivity. In still a further application of this novel imaging system, the imaging member may be repeatedly cycled through the condition of maximum transmissivity with such frequency that an image of substantially constant brightness is produced in the imaging member, this brightness coresonding to the maximum transmissivity condition of the imaging member.

In addition to the primary imaging mechanism (the phase-transition imaging system already described in detail herein), imaging compositions comprising cholesteric liquid crystalline materials may be imaged by the texture-transition system (already described herein) by placing imagewise fields having field strengths above the texture transition threshold of said composition across the desired image areas of the imaging composition. In a fashion analogous to the manner in which the phase-transition imaging system is controlled by the advantageous holding voltages of the present invention, holding voltages having field strengths below the texture change transition threshold of the imaging composition control the transient relaxation of a texture-change imaged composition from its predominantly "undisturbed" texture state back into its predominantly Grandjean or "disturbed" texture state. In this imaging control system, the holding voltage is believed to maintain the previously texture-changed image areas of the composition in a more texture-transformed state than the original, unimaged, predominantly Grandjean or "disturbed" texture state in which the imaging composition is typically found before being imaged by an imagewise field having field strength above the texture-change threshold of the particular imaging composition.

The following examples further specifically define the present invention with respect to an imaging system and controlling an imaging system wherein an imaging composition comprising cholesteric liquid crystalline material is imaged by the application of electrical fields across said composition. The parts and percentages are by weight unless otherwise indicated. The examples below are intended to illustrate various preferred embodiments of the novel liquid crystal imaging system.

EXAMPLE I

An imaging member is provided having a pair of parallel plate transparent electrodes each comprising a substantially transparent continuous coating of tin oxide on a glass substrate, and between the transparent coatings, a spacer gasket of Mylar film, a polyester resin film available from Dupont, enclosing an about 38 micron thick film of imaging composition here comprising a mixture of about 60% cholesteryl chloride and about 40% cholesteryl nonanoate. This imaging member is placed between polars, a polarizer-analyzer combination on each side of imaging member, and an incandescent light source is placed on the outside of the polarizer on the polarizer side of the imaging member and light source, polarizer, imaging member and analyzer, are aligned with a phototube detector which is outside the analyzer on the analyzer side of the imaging member. The imaging member is provided with suitable electrical circuitry to provide an electrical field between the electrodes, and included in said circuitry is a switch for applying voltage to or removing it from the imaging member and simultaneously activating the sweep of an oscilloscope which meters the phototube response. The source-polarizer-imaging-member-analyzer-phototube apparatus is: A Leitz Ortholux polarizing microscope, equipped with a hot stabe and a 10-power objective, which serves as the polarizer-analyzer combination; the imaging member described above placed on the hot stage; the phototube an RCA 7102 photomultiplier with an S-1 spectral response, placed in optical alignment with the other elements of the system; and an incandescent light bulb.

The cholesteric-nematic phase transition threshold voltage for this composition is about 72 volts at about 25°C. This cell is typically imaged at about room temperature. A voltage of about 400 volts is applied to the imaging member or cell, and the imaging composition transforms to the nematic state in about 0.15 seconds. The transformed material appears dark when the imaged member is observed between polars in transmitted light. The field is removed by shorting the leads to the imaging member and the liquid crystalline composition relaxes back into the cholesteric state in a transient response which includes a time period of substantially increased light transmissivity. This maximum transmissivity occurs at about 4 seconds after shorting the imaging member, and the material continues to gradually assume the cholesteric state, and first, the predominantly focal-conic texture. An equilibrium is reached in about 16 to 20 seconds and upon further relaxation the sample will slowly return to its predominantly Grandjean texture. This latter and final relaxation may take quite a long time, ranging from minutes to hours.

A voltage of about 400 volts, (i.e. above the phase-transition threshold field strength) is reapplied, and the imaging cycle repeats itself. The material transforms from its predominantly Grandjean texture to its predominantly focal-conic texture before the cholesteric-nematic phase transition imaging mechanism occurs. Upon phase transition imaging, the imaging member is then returned to a holding voltage, below the cholesteric-nematic threshold, of about −30 volts. The maximum transmissivity in the transient response is now observed to occur about 13 seconds after removing the phase transition imaging field, and the magnitude of the maximum transmissivity is observed to be less than the magnitude of the maximum transmissivity observed when the phase-transition imaged member is entirely shorted as described above.

The data illustrated in FIG. 3 is representative of transient responses of the imaging system of this example when said system has the phase-transition threshold imaging field removed therefrom while the imaging member is under the influence of holding voltage in the range between about 0 and about −47 volts.

EXAMPLE II

The imaging member of Example I is provided with an imaging composition comprising about 60% anisylidene-p-n-butyl aniline and about 40% cholesteryl chloride. This composition has a shorter natural relaxation time than the composition used as the imaging member in Example I. This imaging member is imaged as described as in Example I and is then shorted, without the inventive holding voltage, and the maximum transmissivity occurs about 6 milliseconds after shorting when operated at about 26°C. The cholesteric-nematic phase transmission imaging is achieved by applying about 300 volts to the imaging member, which is subsequently reduced to a holding field voltage of about 110 volts, and the maximum transmissivity in relaxation is observed to occur at about 18 milliseconds after reduction of the imaging field to the holding field strength.

EXAMPLE III

An imaging member like the one described in Example I is provided with the additional feature that one of the transparent electrodes comprises complementary, coplanar image and background configurations which are separated by an insulating space at the boundaries of the image configuration, as described in FIG. 2. This imaging member is imaged by the methods described in Example I by placing a voltage of about 400 volts between the imagewise electrode and the electrode on the opposite side of the film of imaging composition, thereby imaging the film as described in Example I. After phase-transition imaging, the imagewise phase-transition field is removed, and a holding voltage of about −30 volts is placed across the entire surface area of the imaging film, i.e. across both the image and background electrodes. The maximum transmissivity in the imaged areas is observed to occur about 13 seconds after removing the phase-transition imaging field. The phase-transition voltage, of about 400 volts, is then again placed across the film using only the imagewise electrode, and the imaged areas are observed to reimage in a shorter time than was required for the initial imaging of the film.

EXAMPLE IV

An imaging member using imaging composition and spacer gaskets similar to the ones described in Example I is provided wherein the substantially transparent electrodes comprise glass substrates upon which separate strips of substantially transparent conductive tin oxide has been coated, and the substantially transparent electrodes are oriented so that the conductive strips on the respective electrodes cross each other in an x-y matrix or grid pattern with the imaging film between the two sets of conductive strips. Each conductive strip and each set of parallel strips is electrically connected to electrical circuitry suitable for selective operation of each strip individually. The second strips in each of the respective sets or electrodes are connected to opposite poles of a source of potential difference to produce an electrical field of about 400 volts across the imaging film thereby causing phase-transition imaging in the area of the liquid crystalline film between the intersection of the two electrically connected strips, which are on opposite sides of the film. After phase-transition imaging in this area the second strips are disconnected, and the third strips, respectively, on each electrode are electrically connected to the 400 volt phase-transition field, and the area between the intersection of the third strips is phase-transition imaged. The third strips are similarly disconnected and the fourth strips are connected thereby imaging the area of the film between the intersection of the fourth strips. In this way a diagonal line of rectangular imaged areas is created in the imaging film. However, the first imaged rectangular area begins the transient nematic-cholesteric relaxation upon removal of the phase-transition field, and this image area may need periodic renewal as the other areas of the desired image are imaged by the phase-transition mechanism. Such previously imaged areas are renewed by electrically connecting all of the strips on both sides of the imaging film to the phase-transition voltage of about 400 volts, for a few milliseconds, whereby the previously imaged areas are renewed by the phase-transition mechanism, but the previously unimaged areas are not given sufficient time under the influence of a phase-transition field to exhibit the phase-transition.

EXAMPLE V

The imaging member discribed in Example I is provided and placed in a magnetic field having a field strength of about 5000 gauss, with the direction of the magnetic field being parallel to the direction in which the imaging member is viewed. An imagewise electric field of about $2 \times 10^4$ volts/cm is then applied across the liquid crystalline imaging composition and are connected thereby imaging the area of the film between the intersection of the fourth strips. In this way a diagonal line of rectangular imaged areas is created in the imaging film. However, the first imaged rectangular area begins the transient nematic-cholesteric relaxation upon removal of the phase-transition field, and this image area may need periodic renewal as the other areas of the desired image are imaged by the phase-transition mechanism. Such previously imaged areas are renewed by electrically connecting all of the strips on both sides of the imaging film to the phase-transition voltage of about 400 volts, for a few milliseconds, whereby the previously imaged areas are renewed by the phase-transition mechanism, but the previously unimaged areas are not given sufficient time under the influence of a phase-transition field to exhibit the phase-transition.

EXAMPLE V

The imaging member described in Example I is provided and placed in a magnetic field having a field strength of about 5000 gauss, with the direction of the magnetic field being parallel to the direction in which the imaging member is viewed. An imagewise electric field of about $2 \times 10^4$ volts/cm is then applied across the liquid crystalline imaging composition and an image is observed. The electric field is then removed from the imaging member and the magnetic field provides a holding field.

EXAMPLE VI

An imaging member such as that described in Example I is provided with the exception that the surfaces of the conducting plates are given a surface treatment by rubbing them with lecithin. An imagewise thermal signal is directed upon the imaging member, the signal being sufficient to raise the temperature of the liquid crystalline imaging composition to about 42°C in the imaged areas. At this temperature the imaging composition become nematic. Surface interaction causes the molecules to align perpendicular to the surface of the imaging member, parallel to the viewing direction.

EXAMPLE VII

A layer of a composition made up of 59 percent cholesteryl chloride and 41 percent cholesteryl nonanoate is placed between a pair of parallel plates such as are described in Example I separated by a 1 mil thick Mylar spacer. The cholesteric-nematic phase transition threshold voltage for this composition is about 35 volts at about 30°C. The sample is thermally biased to about 30°C and a holding voltage of about 15 volts is applied. A thermal image signal is applied to the sample raising the temperature of the imaging composition to about 40°C in the imaged areas. The cholesteric-nematic threshold voltage of the liquid crystalline composition is about 2 volts at about 40°C. An imagewise transformation occurs. The thermal image signal is then removed and the temperature of the imaged areas returns to about 30°C. The holding voltage prevents the image from relaxing so that it is retained for about 20 seconds whereas it is only retained for about 4 seconds without the holding voltage.

EXAMPLE VIII

The imaging cell and liquid crystalline composition described in Example VII are again used. The cell is imaged at about 26°C. An imagewise electrical field of about 400 volts is applied imagewise across the liquid crystalline layer and a cholesteric-nematic phase transition occurs in the field-affected areas of the imaging layer. The temperature of the sample is raised to about 40°C and the field removed by shorting the leads to the imaging member. The image is retained for about 10 seconds whereas it is only retained for about 4 seconds without the thermal holding field.

EXAMPLE IX

The imaging cell and liquid crystalline composition described in Example VII are again used. The sample is biased to a temperature of about 38°C. A thermal image is applied to the imaging cell raising the temperature of the liquid crystalline composition to about 42°C in the field-affected areas and the imaging composition transforms to the nematic state. The thermal field is removed and the temperature of the sample returns to about 38°C. The image is retained for about 10 seconds whereas it is only retained for about 4 seconds at 25°C.

EXAMPLE X

The imaging cell and liquid crystalline material described in Example VII are again used. The sample is biased to a temperature of about 59°C. The cholesteric-nematic phase transition threshold voltage at about 59°C is about 86 volts. A thermal imagewise field is applied to decrease the temperature of the sample in the field-affected areas to about 42°C and the imaging composition transforms to the nematic state. The thermal image is removed and the temperature of the sample returned to about 59°C. At the same time an electric field of about 60 volts is applied across the sample. This holding field allows the image to be retained for about 4 seconds whereas it is only retained for about 0.2 seconds without the holding voltage.

EXAMPLE XI

A layer of an imaging composition made up of about 98 percent of p-azoxyanisole and about 2 percent cholesteryl chloride is placed in an imaging cell such as that described in Example VII. The imaging cell is heated to a temperature of about 129°C at which temperature the pitch of the imaging composition is about 15 microns. The imaging cell is subjected to an imagewise magnetic field having a field strength of about 10 kilogauss with the direction of the magnetic field being perpendicular to the surface plane of the imaging cell and parallel to the viewing direction. An imagewise phase transition occurs. The strength of the magnetic field is then reduced to about 5 kilogauss which is sufficient to provide a holding field.

EXAMPLE XII

A layer of an imaging composition made up of about 99 percent of p-azoxyanisole and about 1% cholesteryl acetate is placed in an imaging cell such as that described in Example VII with the exception that a 2 mil thick Mylar spacer is used. The imaging cell is heated to about 119°C at which temperature the imaging composition has a pitch of about 13 microns. The imaging cell is placed in an imagewise magnetic field having a field strength of about 8.5 kilogauss with the direction of the magnetic field being perpendicular to the surface plane of the imaging cell and parallel to the viewing direction. An imagewise phase transition occurs. The strength of the magnetic field is reduced to about 5 kilogauss which is sufficient to provide a holding field.

Although specific components and proportions have been stated in the above description of the preferred embodiments of the advantageous liquid crystalline imaging system and imaging control system of the present invention, other suitable materials and variations of the various steps in the system as listed herein, may be used with satisfactory results and various degrees of quality. In addition, other materials and steps may be added to those used herein and variations may be made in the process to synergize, enhance or otherwise modify the properties of the invention. For example, various other mixtures of liquid crystals which will undergo the phase-transition and texture transition imaging processes may be discovered and used in the system of the present invention, and such mixtures may require somewhat different thicknesses, threshold fields, holding fields, temperature ranges, and other imaging conditions for preferred results in accordance with the present invention. Likewise, various other means of creating electrical fields or altering the threshold voltages, and other means of addressing the inventive imaging members may be used with satisfactory results in the present invention.

It will be understood that various changes in the details, materials, steps, and arrangements of elements which have been herein described and illustrated in order to explain the nature of the invention, will occur to and may be made by those skilled in the art, upon a reading of this disclosure and such changes are intended to be included within the principle and scope of this invention.

What is claimed is:

1. An imaging method comprising providing a layer of imaging composition comprising cholesteric liquid crystalline material at a temperature in the cholesteric-nematic phase transition temperature range of said layer comprising image portions comprising the phase-transformed nematic liquid crystalline state and complementary background portions comprising the cholesteric liquid crystalline state, and applying a holding field across the entire area of said layer, said field having a field strength below the phase transition field strength of the imaging composition and at least about 50 percent of the phase transition field strength.

2. The method of claim 1 wherein said holding field comprises an electric field.

3. The method of claim 2 wherein the imaged layer of imaging composition is provided by providing a layer of imaging composition comprising cholesteric liquid crystalline material in the cholesteric-nematic phase transition temperature range of said composition, and applying an imagewise electrical field across said composition, said imagewise field of a field strength within the cholesteric-nematic nematic phase transition electrical field strength range of said composition.

4. The method of claim 3 wherein said electrical holding field is maintained across the entire surface area of said layer throughout the relaxation of the imaged areas from the imaged nematic state back into the cholesteric state, whereby the relaxation response of the composition is controlled.

5. The method of claim 3 wherein the imaging composition comprises a mixture of cholesteric and nematic liquid crystalline materials.

6. The method of claim 3 wherein the imaging composition comprises a mixture of cholesteric and smectic liquid crystalline materials.

7. The method of claim 3 wherein the layer of imaging composition is of a thickness not greater than about 10 mils.

8. The method of claim 7 wherein the layer of imaging composition is of a thickness in the range between about ¼ mil and about 5 mils.

9. The method of claim 3 wherein the layer of imaging composition is viewed with means for enhancing contrast between the image and background areas.

10. The method of claim 9 wherein the imaging composition is viewed between polarizers.

11. An imaging method comprising the method of claim 3 and thereafter re-imaging the layer of imaging composition by applying an imagewise electrical field across said composition, said imagewise field of a field strength within the cholesteric-nematic phase transition electrical field strength range of said composition.

12. A method of renewing an image comprising the method of claim 3 and thereafter applying an electrical field across the entire surface area of said layer of imaging composition, said field having a field strength within the cholesteric-nematic phase transition electrical field strength range of said composition, and maintaining this field across the entire surface area of said layer for a length of time wherein the previously imagewise cholesteric-nematic phase transformed areas have the phase transformation renewed therein, but the background areas remain substantially in the cholesteric liquid crystalline state.

13. An imaging method comprising
a. the method of claim 3 wherein said electrical holding field is maintained across the entire surface area of said layer until previously imaged areas of said layer are about at the point of maximum transmissivity in the nematic-cholesteric relaxation, and
b. said layer is then re-imaged by reapplying the same imagewise electrical field across said composition, said imagewise field of a field strength within the cholesteric-nematic phase transition electrical field strength range of said composition.

14. An imaging method comprising
a. the method of claim 3 wherein said electrical holding field is maintained across the entire surface area of said layer until previously imaged areas of said layer are at about the point of maximum transmissivity in the nematic-cholesteric relaxation, and
b. said layer is then re-imaged by applying an electrical field across the entire surface area of said layer of imaging composition, said field having a field strength within the cholesteric-nematic phase transition electrical field strength range of said composition, and maintaining this field across the entire surface area of said layer for a length of time wherein the previously imagewise cholesteric-nematic phase transformed areas have the phase transformation renewed therein, but the background areas remain substantially in the cholesteric liquid crystalline state.

15. An imaging method comprising cyclicly repeating steps (a) and (b) of claim 14 a plurality of times whereby an image is maintained in the layer of imaging composition.

16. An imaging method comprising
providing an imaging member comprising a layer of imaging composition comprising cholesteric liquid crystalline material, said layer between a pair of electrodes, at least one of which is substantially transparent and at least one of which is shaped in a desired image configuration, and means for applying an electrical field between said electrodes across the layer of imaging composition,
and performing the method of claim 3 upon said imaging composition.

17. The method of claim 16 wherein both electrodes are shaped in a desired image configuration.

18. The method of claim 17 wherein the electrodes comprise a pair of sets of parallel strip electrodes, and said pair of parallel strip electrodes are oriented crossing each other in an X–Y grid pattern.

19. The method of claim 16 wherein both electrodes are substantially transparent.

20. The method of claim 16 wherein the layer of imaging composition is of a thickness not greater than about 10 mils.

21. The method of claim 16 wherein the imaging member is viewed with means for enhancing contrast between the image and background areas.

22. The method of claim 21 wherein the imaging member is viewed between polarizers.

* * * * *